Oct. 10, 1933.  H. W. INGLE  1,930,439
APPARATUS FOR FORMING GLASS PARISONS
Filed Nov. 29, 1930  4 Sheets-Sheet 1
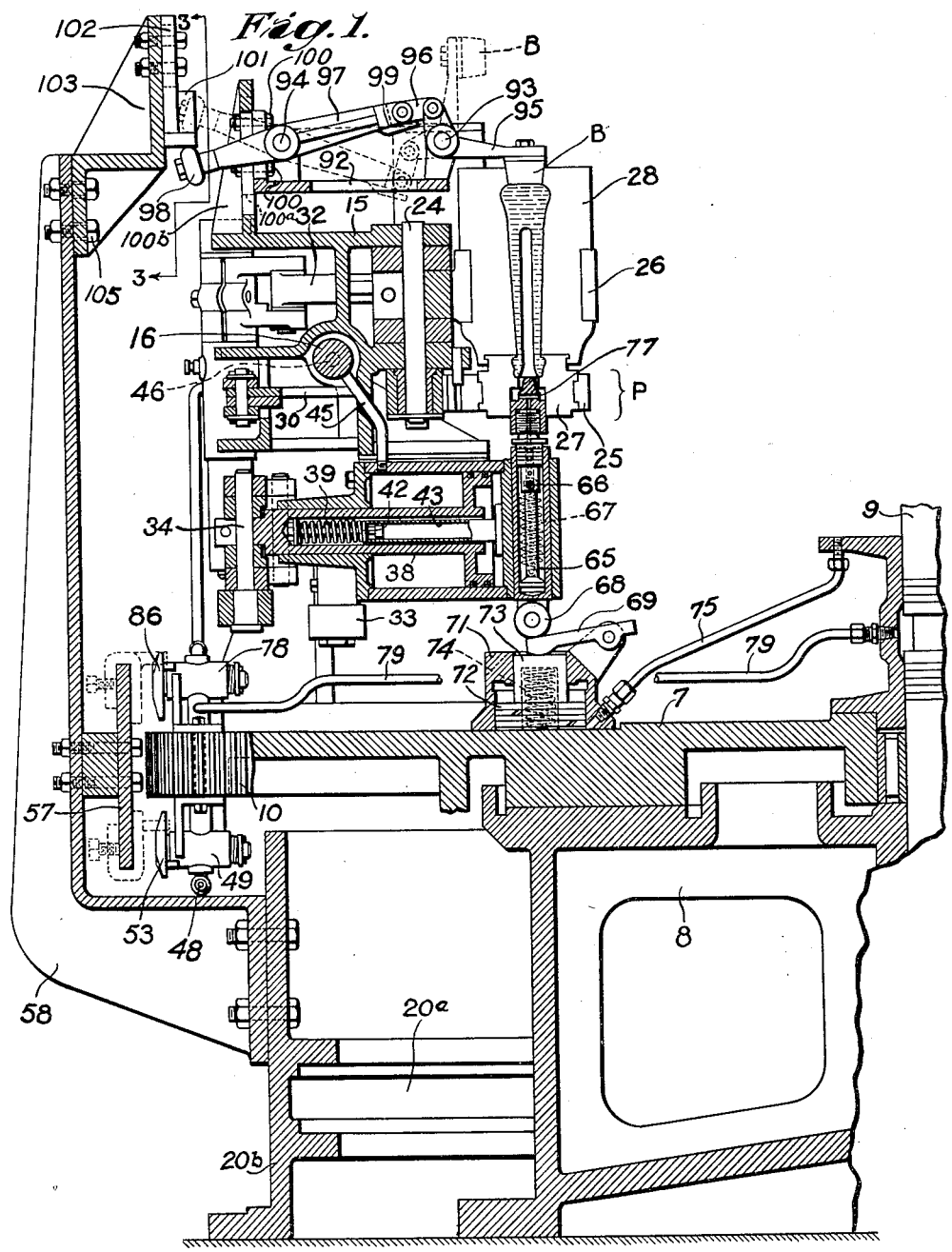
Inventor;
Henry W. Ingle,
By Brown & Parham
Attorneys
Witness:
W. B. Thayer.

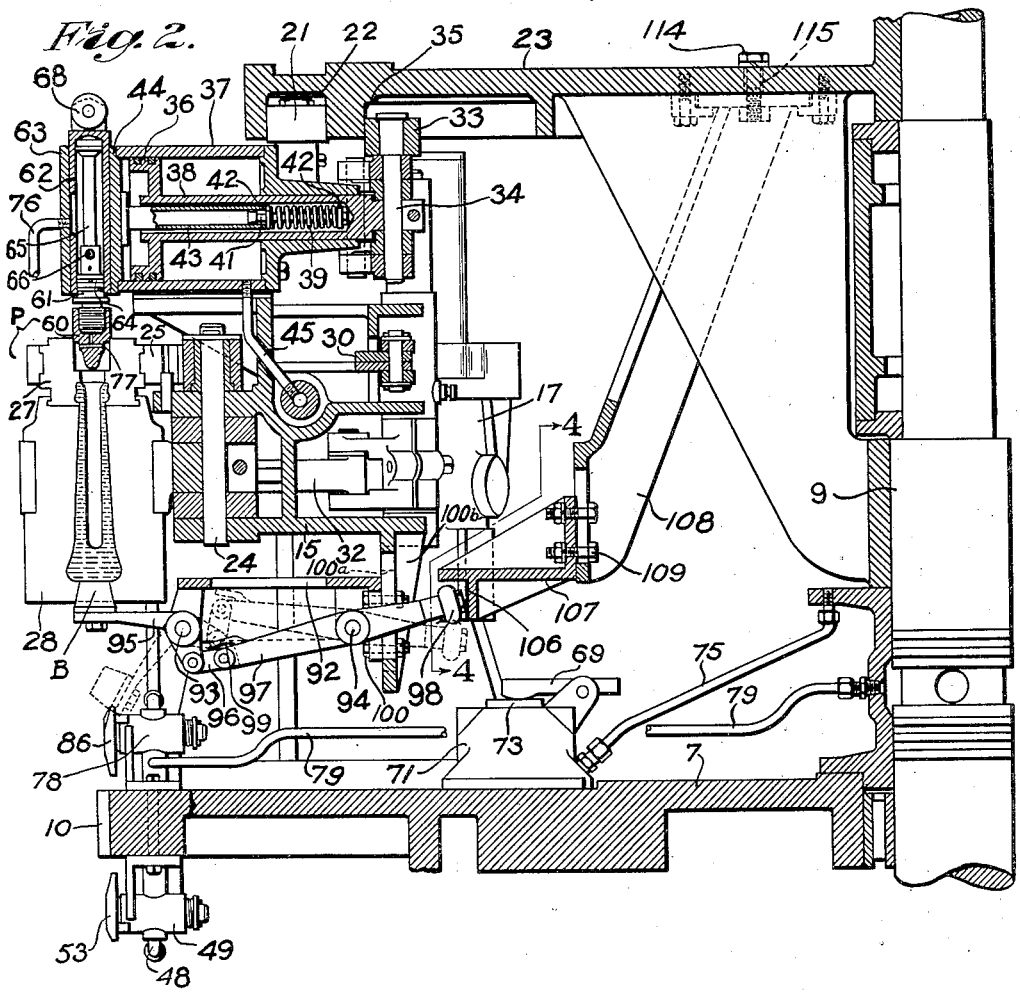
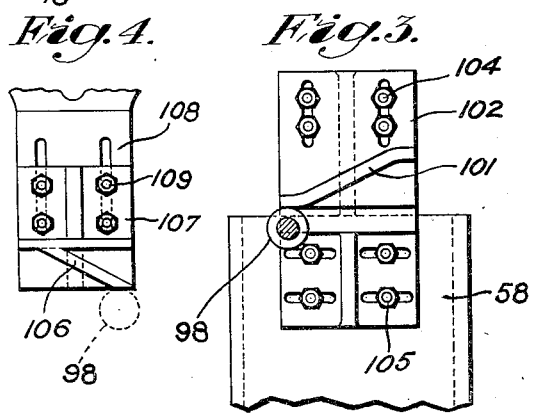

Oct. 10, 1933.  H. W. INGLE  1,930,439

APPARATUS FOR FORMING GLASS PARISONS

Filed Nov. 29, 1930  4 Sheets-Sheet 3

Oct. 10, 1933.   H. W. INGLE   1,930,439
APPARATUS FOR FORMING GLASS PARISONS
Filed Nov. 29, 1930   4 Sheets-Sheet 4

Witness;
W. B. Thayer.

Inventor;
Henry W. Ingle,
by Brown + Parham
Attorneys

Patented Oct. 10, 1933

1,930,439

UNITED STATES PATENT OFFICE 1,930,439

APPARATUS FOR FORMING GLASS PARISONS

Henry W. Ingle, West Hartford, Conn., assignor to Hartford-Empire Company, Hartford, Conn., a corporation of Delaware Application November 29, 1930
Serial No. 498,973

15 Claims. (Cl. 49—9)

This invention relates to glassware forming machines of the character in which a charge of glass for a parison is supplied to an inverted parison forming unit, which unit afterwards is reverted for subsequent delivery of the parison formed therein to a finishing mold in which the parison is blown to final form. The invention has particular relation to a glassware forming machine of the foregoing character and embodying mechanism for counterblowing a charge of glass in the parison forming unit to effect the shaping of the charge therein into a parison.

In the formation or fabrication of glassware in a machine of the type in which the parison forming unit is inverted to be charged with glass and afterwards reverted, it is customary first, to settle blow the charge of glass in the inverted unit to compact the charge in the neck mold around a neck pin projecting therethrough to form the neck of a parison, and also to force the glass into contact with the body mold. The neck pin of the unit is then retracted and the charge counterblown to form a parison of the desired shape and size, to enlarge the blowing cavity previously formed in the charge by the neck pin, to distribute the glass in the parison in a manner most suitable for subsequent fabrication, and to abstract heat from the parison to properly condition the glass for further shaping.

Because of the effect of the counterblowing operation on the properties of the glass constituting a parison, it is important to begin and terminate the counterblowing at the proper time, and to counterblow for the proper length of time. The distribution of glass in a parison effected by the counterblowing operation, and the physical conditions brought about by such counterblowing, bear a definite relation to the finish blowing of the parison in the finishing mold, and in fact, to the speed at which glassware may be produced and the quality of the glassware. The times of beginning and ending and the length of the period of the counterblowing may vary for different sizes and/or shapes of glassware and for different kinds of glass.

It is the general object of this invention to provide mechanism of novel character in which a parison forming unit is inverted and reverted during the parison mold cycle, as above explained, which mechanism is so arranged and constructed as to permit a relatively wide variation in the step of counterblowing a charge of glass into a parison in said unit. Thus, according to the invention, the counterblowing may be begun as desired prior to the reversion of the unit or during the time in which the unit is being reverted and, if desired, continued until after the reversion of said unit, or it may be both started and stopped after reversion.

More specifically it is an object of the invention to provide a rotating glassware forming machine, including a parison forming unit which is inverted for the reception of a charge and afterwards reverted, and embodying mechanism of novel character for counterblowing the charge, during the rotation of the machine into a parison prior to and/or during the reversion of said unit.

A further object of the invention is to provide novel means for the supply of counterblowing air to, and for effecting the operation of a counterblow baffle plate of, a parison forming unit which is inverted to receive a charge and afterwards reverted, whereby the parison in said unit may be formed by counterblowing at times selected according to the character of the glass being shaped and according to the characteristics of the glassware being produced.

Other objects of the invention will be pointed out in the detailed description thereof which follows, or will become apparent from such description.

In order that the invention may be more readily understood and its advantages fully appreciated, reference should be had to the accompanying drawings in which apparatus embodying the invention is shown.

In said drawings:

Figure 1 is a view in vertical sectional elevation of a portion of a parison mold table of a two-table glassware forming machine, showing one of the parison forming units of said machine in inverted position, the other of said units and parts of said machine being omitted for clearness of illustration;

Fig. 2 is a view similar to Fig. 1, showing the parison forming unit in reverted position and angularly advanced with respect to the axis of the mold table and with respect to the position in which said unit is shown in Fig. 1;

Fig. 3 is an enlarged view in elevation of a cam for operating baffle plate mechanism associated with the parison forming unit shown in Figs. 1 and 2, said view being taken substantially on the line 3—3 of Fig. 1;

Fig. 4 is a view similar to Fig. 3, but showing an additional cam for operating the counterblow baffle plate, said view being taken substantially on the line 4—4 of Fig. 2;

Fig. 6 is an enlarged view in top plan of the parison forming unit of Figs. 1 and 2 in inverted position; and Fig. 7 is a diagrammatic view showing certain air connections to the parison forming unit.

Figure 5:
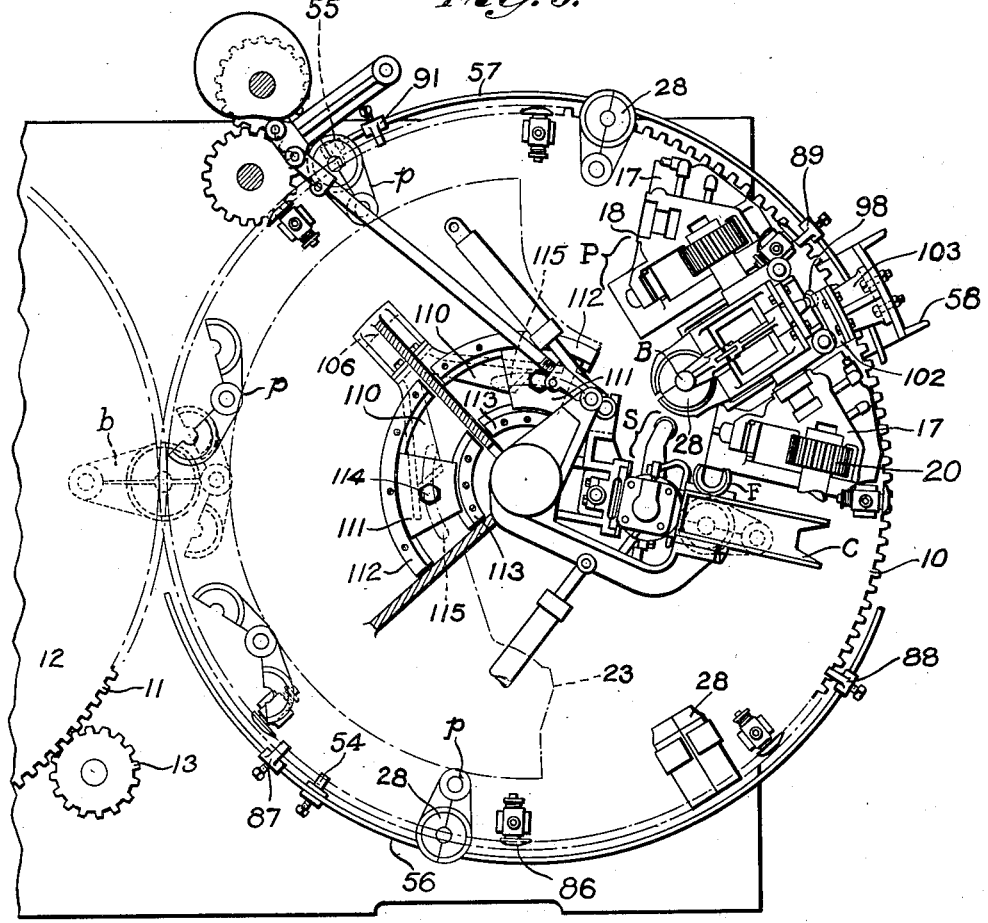
Fig. 5 is a partially diagrammatic view in top plan of the parison mold table partially shown in Figs. 1 and 2, illustrating the disposition of parison forming units on the parison mold table, and indicating the relation of the parison mold table to an adjacent blow mold table.

In order to simplify the illustration and description of one embodiment of the invention, said embodiment is illustrated in the drawings as it might be applied to a continuous two-table glassware forming machine of the character disclosed in the copending application of Edward H. Lorenz and George E. Rowe, Ser. No. 492,407, filed Oct. 31, 1930. The invention in this case may in fact be regarded as a modification of or improvement on the invention disclosed in said application, Ser. No. 492,407.

Although the invention is illustrated as being incorporated in a machine of the character shown in the aforesaid application, it will be understood that it is susceptible of embodiment in other known types of glassware forming machines wherein parison forming units are inverted for the reception of charges of glass and afterwards are reverted.

Generally considered, apparatus embodying the invention may include a parison mold table mounted for rotation about a vertical axis adjacent to a finishing mold table similarly mounted, both tables preferably being adapted to be continuously rotated. The parison mold table may carry a plurality of parison forming units, one of which is shown in detail at P, charges of glass being successively guided into said units from a suitable feeder not shown, by means of a guide or funnel F associated with a suitable funnel chute C. Settle blow head mechanism designated generally at S may be provided for successively settle blowing the charges of glass delivered to the parison forming unit. Other parison forming units are shown diagrammatically at p and a blow mold is similarly shown at b.

The general arrangement of the mold tables, the construction and operation of the guide or funnel F and of the settle blow head mechanism S and the general construction and operation of the parison forming units, may be similar to like parts of the machine illustrated and described in the aforesaid copending application of Edward H. Lorenz and George E. Rowe. Such parts of the apparatus partially shown herein do not per se form parts of the present invention and hence all are not illustrated and described in complete detail.

As distinguished from the machine disclosed in said copending application and from other similar machines, apparatus embodying the present invention comprises a counterblow baffle plate designated generally at B adapted to be moved by novel mechanism into operative position, as illustrated for example in Fig. 1, to enable the counterblowing of the charge into a parison to be initiated as desired prior to, during or after the reversion of the parison forming unit and thereafter continued. The apparatus of the present invention is further distinguished from the aforesaid machines by the provision of novel means for supplying counterblowing and neck pin and mold cooling air to the parison forming unit at the desired times, and for selected periods.

The illustrated embodiment of the invention now will be described with particular reference to the above mentioned distinguishing features of the invention.

The parison mold table 7 is shown as mounted upon a suitable pedestal 8, Fig. 1, for rotation about a vertical column 9. Formed on the periphery of the table 7 is a gear 10, Figs. 1, 2, 5 and 6, meshing with a similar gear 11, Fig. 5, on a blow mold table 12, which gear in turn, is engaged by a pinion 13 from which the mold tables are continuously rotated in opposite directions. Any suitable means may be provided for driving the pinion.

The blow mold table 12 may carry a number of blow molds such as indicated at b to which parisons may be transferred from the parison forming units on the table 7.

As previously stated, the parison forming unit P is similar to the parison forming units of the glassware forming machine disclosed in the copending application of Edward H. Lorenz and George E. Rowe. Said unit as shown in detail, comprises a casting 15, Figs. 1, 2 and 6, through which extends a shaft 16, the ends of which are trunnioned in suitable pedestals 17 and 18 arising from the top of the table 7. Such mounting of the parison forming unit permits it to be inverted inwardly of the mold table and reverted outwardly thereof in a vertical plane, and about an axis tangential to a circle concentric with the axis of the mold table. The inversion and reversion of the parison mold unit may be effected at appropriate times by means of a rack 19, Figs. 5 and 6 in mesh with a pinion 20 on one end of shaft 16. The rack 19 may extend downwardly through the mold table to where it is operatively connected by means (not shown) to a cam 20a, Fig. 1, of suitable contour, for reciprocating the rack and inverting and reverting the parison mold unit. Cam 20a may be formed on the interior of a drum 20b surrounding pedestal 8. Mechanism such as that shown in the copending application, Ser. No. 492,407 may be interposed between rack 19 and cam 20a.

At the appropriate time, rack 19 is operated to invert the unit P for the reception of a charge of glass guided into the molds of the unit by the funnel F and to permit subsequent engagement of the settle blow head S therewith for compacting the charge. Subsequently the rack 19 is operated to revert the parison forming unit and the unit may be held positively in such reverted position by means of engagement of a roller 21, Fig. 2, with a cam 22 formed on the under side of a plate 23 overhanging the mold table and appropriately mounted on the column 9 of the table.

Mounted in lugs forming a part of casting 15 is a hinge pin 24 carrying holders 25 and 26 for the sections 27 and 28 respectively of the neck mold and body mold of the parison forming unit.

The holders 25 of the neck mold sections may have links 30 connected thereto suitably operated as by means of cam mechanism, not shown, to open and close the neck mold. A tension spring 31, Fig. 6, may be arranged to yieldingly hold the neck mold closed.

Connected to the holders 26 for the sections of the body mold are links 32, Figs. 1 and 2 which are actuated through suitable linkage connected to a cam roller 33 on pin 34, which roller is adapted to cooperate with a cam 35, Fig. 2, on the under side of plate 23. Such engagement of roller 33 with cam 35 occurs when the parison forming unit is in reverted position as shown in Fig. 2.

Pneumatic means also may be connected to pin 34 and through said pin and mold operating linkage may operate the body mold as hereinafter specified. Said means includes a piston 36, Figs. 1, 2 and 7, in a cylinder 37 secured to the top of the casting 15. The tubular rod 38 of piston 36 extends through the inner head (Fig. 2) of the cylinder 37 to where it receives the pin 34 as is clearly shown in Figs. 1 and 2.

Air is admitted to the space in the inner end (Fig. 2) of cylinder 37 which acts on piston 36 to close the body mold under the control of cam 35 and to hold the body mold closed while the parison forming unit is being inverted and reverted, and while a parison is being counterblown in the body mold.

Air may be exhausted from the space in the inner end (Fig. 2) of cylinder 37 to crack the body mold upon completion of the counterblowing of a charge of glass into a parison to permit the parison to reheat while enclosed by but out of contact with the mold, such exhaust also permitting subsequent complete opening of the body mold by the cooperation of roller 33 with cam 35 preparatory to the transfer of the parison to a companion finishing mold (b) on the finishing mold table.

The extent to which the body mold is cracked for the reheat of the parison after counterblowing is limited by means including a compression spring 39 in the tubular piston rod 38, which spring encircles a pin 41, Fig. 2, said pin being provided with a nut on its inner end and a head on its outer end against which collars 42 on the pin are urged by the compression spring 39. The outermost collar 42 abuts the inner end of a tubular stop member 43, the other end of which bears against the head 44 of cylinder 37. Such engagement of the outermost collar 42 with the tubular stop 43 is effected when the spring 39 is put under compression by the movement of piston 36 to the left looking at Fig. 2.

Upon exhaust of air pressure in the space in the inner end of cylinder 37, spring 39 expands to crack the body mold to an extent limited by the engagement of the head on pin 41 with collar 42. Thus the extent of mold cracking or parting for the reheat of a parison is predetermined.

Air pressure is admitted into and exhausted from cylinder 37 through a conduit 45, Figs. 1, 2, and 7, connected to a passageway 46 in shaft 16, and opening into a chamber 47 adjacent the bearing in pedestal 18 for one end of shaft 16. See Figs. 6 and 7. Chamber 47 in turn has a conduit 48 connected thereto leading from a valve 49 of the rotary plug type, secured to the under side of table 7 near the periphery thereof, as shown in Figs. 1 and 2.

Valve 49 has an air inlet port 51 and an exhaust port 52 which ports alternately are placed in communication with conduit 48 upon rotation of the rotary plug portion of valve 49 into the required positions. Such rotation is effected by means of a dog 53, Figs. 1 and 2, moved in a circular path as a result of the rotation of the table 7, in which path are located stop members or buttons 54 and 55 adjustably mounted on rails 56 and 57, respectively. Rail 56 may be carried by suitable brackets, not shown, arising from the base of the machine and rail 57 may be supported near one end by its connection to a standard or bracket 58, Fig. 1, secured to the drum 20b in which the invert cam 20a is formed. Rail 57 may be supported at or near its other end by means of a bracket not shown.

Prior to the time that the parison forming unit is inverted for the delivery of a charge thereto, dog 53 strikes stop 54 to turn the valve 52 to air supply position as the result of which air pressure flows into cylinder 37 applying power to piston 36 to close the parison body mold under the control of cam 35. When cam roller 33 is moved out of engagement with cam 35 the pneumatic pressure serves to hold the body mold closed during the inversion of the parison forming unit, while said unit is held inverted, and for a period of time after the unit is reverted. The rotation of the table moves stop 53 into engagement with stop 55 which turns the valve 49 to exhaust position permitting spring 39 to effect the partial opening or cracking of the body mold for the reheat of a parison.

By adjusting stops 54 and 55 on their respective rails, the times at which air is supplied to and exhausted from cylinder 37 may be varied.

A neck pin 60 is associated with the neck mold and the manner in which it is supported and operated now will be described. The neck pin 60 is screw threaded on a carrying member 61 loosely fitting in a sleeve 62 slidably mounted in a tubular boss 63 formed on the head 44 of cylinder 37.

The engagement of the carrying member 61 with the sleeve 62 is made air tight by the provision of piston rings 64 on the carrying member. Said member is connected to a plunger 65 in the sleeve 62 by means of a pin 66, the ends of which may extend through the sleeve 62 and boss 63 to where they are connected to tension springs, one of which is indicated at 67, Fig. 1, said springs yieldingly holding the neck pin in retracted position.

The neck pin may be projected inwardly of the neck mold into operative position in response to the inversion of the parison forming unit, such inversion causing a roller 68 on sleeve 62 to engage the outer end of a radially disposed lever 69, Figs. 1 and 2, pivoted in lugs on the cylinder 71 of an air motor.

Located in cylinder 71 is a piston 72 having a reduced upwardly extending portion or rod 73 upon the upper end of which rests the outer end of lever 69. The piston 72 and its extension 73 are recessed to receive a compression spring 74 which yieldingly urges the piston into uppermost position.

Air pressure may be admitted into cylinder 71 through a conduit 75 so that when the parison forming unit is inverted, lever 69 will be held in a position for engagement with roller 68 to project the neck pin inwardly of the neck mold. Upon exhaust of such fluid pressure from cylinder 71, the neck pin may be retracted for counterblowing by the tension spring connected thereto as illustrated in Fig. 1.

The fluid pressure which is admitted to cylinder 71 not only holds lever 69 in a position to cause the neck pin to be projected inwardly of the neck mold upon inversion of the parison forming unit, but also retains the neck pin in operative position in opposition to the pressure of settle blowing air thereon, which air is introduced into the parison forming unit by settle blow head S to compact a charge of glass therein. Such air pressure in cylinder 71 also serves to counterbalance the force of the settle blow head on the parison forming unit to relieve the inverting mechanism of the unit from such force.

The means for controlling the admission and exhaust of air to and from cylinder 71 by way of conduit 75 is not shown in the drawings, such means forming no part per se of the present invention and being completely shown in the co-pending application, Ser. No. 492,407 of Edward H. Lorenz and George E. Rowe.

Air is introduced into the parison forming unit through the neck pin 60 for counterblowing the charge into a parison. Air also may be supplied to the neck pin for cooling it and the parison body mold after a parison has been removed therefrom. Such supply of air is effected through a conduit 76, Figs. 2 and 7, connected to the boss 63 and communicating with the interior of sleeve 62 through a port formed therein. Through the sleeve 62 air may flow through suitable ports, not shown, in the neck pin carrying member 61 and through ports 77 in the neck pin itself.

The supply of air through conduit 76 may be controlled by a rotary plug valve 78 mounted on the top of table 7 near the periphery thereof, said valve being similar to valve 49 previously referred to and also being adapted to exhaust fluid pressure from conduit 76, the interior of sleeve 62 and the ports in the neck pin.

Valve 78 receives air pressure from an air supply conduit 79 leading from a suitable source, not shown, to the air inlet port 81 of the valve which port may communicate with the air inlet port 51 of valve 49 through the table 7, as shown in Fig. 7, for the supply of air pressure to said valve 49.

Valve 78 is provided with an exhaust port 82 and an outlet port to which is connected a conduit 83 opening into a chamber 84 provided adjacent the bearing for shaft 16 in the pedestal 17, as shown in Fig. 6. Chamber 84 communicates with the conduit 76 through a passageway 85 in shaft 16.

The yoke member 92 which carries the baffle plate B and its operating mechanism preferably is secured to casting 15 for vertical adjustment by means of bolts 100, Figs. 1, 2 and 6, passing through spaced vertical slots 100a in bracket 100b, projecting from the casting 15. Thus the baffle plate may easily be "set up" for cooperation with parison molds of different lengths.

In lieu of the above described adjusting means, baffle plate B may be operatively connected to lever 95 by means of an air motor (not shown) appropriately operated at the required times in conjunction with the swinging of the baffle plate into and out of vertical alignment with the mold cavity, to seat and unseat the baffle plate.

Valve 78 is operated by means of a dog 86 on the rotary portion thereof, Figs. 1, 2, 5, and 6, which is moved in a circular path by the rotation of the table in which path are located stop members 87 and 88 on the rail 56 and similar stop members 89 and 91 on rail 57. Stops 87 and 88 which are adjustably mounted on the rail 56 are successively engaged by dog 86 to move valve 78 to air supply and exhaust positions successively for the cooling of the neck pin and parison body mold. Stops 89 and 91 which likewise are adjustably mounted on rail 57, are successively engaged by dog 86 to move valve 82 to air supply and exhaust position for the supply of counterblowing air to the parison forming unit by way of the conduits previously described. By adjusting stops 87, 88, 89 and 91, the periods of neck pin and mold cooling and of counterblowing may be varied as desired.

The mechanism for operating the counterblow baffle plate B now will be considered.

As shown in Figs. 1, 2 and 6, the casting 15 of the parison forming unit has a yoke member 92 secured to the bottom thereof in the opposite ends of which shafts 93 and 94 are pivotally mounted. Pivoted on shaft 93 is a bell crank lever 95, the longer arm of which carries the counterblow baffle plate B removably secured thereto. The other arm of the bell crank lever is connected to a link 96 which in turn is pivotally joined to a lever 97 on the shaft 94. The free end of lever 97 carries a cam roller 98 which successively engages cams hereinafter pointed out, for swinging the counterblow baffle plate into and out of operative position.

When lever 97 is rocked in a counterclockwise direction, looking at Fig. 1, bell crank lever 95 is rocked in the opposite direction to move the counterblow baffle plate into the opening in the bottom of the parison body mold 28, as shown. Such movement causes the link 96 to slightly pass a dead center position with respect to lever 97 to an extent limited by a stop 99 on the lever 97 and underlying the link 96. Such operation of link 96 serves to lock the counterblow baffle plate in operative position.

Movement of the counterblow baffle plate into operative position is effected by means of a cam 101, Figs. 1, 2, and 5, formed on a plate 102 bolted for vertical adjustment on bracket 103 which in turn is bolted for horizontal adjustment on the upper end of the standard 58, previously mentioned. Referring to Fig. 3 it will be seen that plate 102 is secured to the bracket 103 by bolts 104 passing through vertical slots in said plate. It likewise will be seen that bracket 103 is secured to the upper end of standard 58 by bolts 105 extending through horizontal slots in the bracket. Such construction permits either vertical or horizontal adjustment of cam 101 to vary the time at which the counterblow baffle plate is moved into operative position, and to suit the operation of the baffle plate mechanism to baffle plates of different sizes and molds of different lengths.

As shown in Fig. 1, cam 101 is so positioned that the rotation of the table 7 brings cam roller 98 into engagement with the under side of the cam effecting downward movement of the outer end of lever 97 (Fig. 1) and the movement of counterblow baffle plate B and the locking thereof in operative position as it is shown in full lines in said Fig. 1.

For moving the counterblow baffle plate to inoperative position, a cam 106, Figs. 2 and 4, is supported at the proper distance in advance of cam 101 and at the proper level for engagement by cam roller 98 when the parison forming unit is in reverted position. Cam 106 is formed on a bracket 107 secured to the lower end of a support 108 by bolts 109 extending through vertical slots in the bottom end of the support. Such arrangement provides for vertical adjustment of cam 106 for the same purpose as the vertical adjustment of cam 101.

Support 108 is connected to the under side of the cam plate 23 by means affording angular adjustment of said support and hence of the cam 106. As shown in Figs. 2 and 5, support 108 comprises a pair of upwardly extending diverging arms 110 having horizontal segmental portions 111 formed on the top thereof received between pairs of circular guides 112 and 113. The support 108 is held in adjustably fixed position in the guides by bolts 114 extending downwardly through circular slots in plate 23, which slots are indicated in dot and dash lines at 115 in Fig. 5, and the said bolts passing through the segmental portions 111 formed on the upper ends of the arms of the support. By loosening the bolts 114, the support 118 and hence cam 106 may be angularly adjusted as desired.

By reference to Figs. 2 and 4, it will be seen that the cam roller 98 on lever 97 is carried into engagement with cam 106 as a result of the rotation of the mold table, cam 106 being shaped to rock lever 97 in a clockwise direction (Fig. 2) to move the counterblow baffle plate to inoperative position or into the position in which it is shown in dotted lines in Figs. 1 and 2.

Although only one parison forming unit has been described in detail, it will be understood that mechanism embodying the invention generally will comprise a plurality of such units similar or identical with the unit and associated mechanism above described, each unit including valves 49 successively operated by stop members 54 and 55, for controlling the operation of pneumatic mold operating means, valves 82 such as are indicated in Fig. 5 which are successively operated by stops 87, 88, 89 and 91 for successively supplying neck pin and body mold cooling air and counterblowing air to the various parison forming units, and counterblow baffle plate mechanisms successively operated by cams 101 and 106 to move the baffle plates into and out of operative positions successively at times predetermined by the adjustment of the cams.

Except for the previously described novel mechanism for supplying cooling air and counterblowing air to the parison forming unit, and the novel mechanism for operating counterblow baffle plate and the arrangement of such mechanism and baffle plate, the apparatus shown fragmentarily and diagrammatically in the drawings may be identical to that completely shown in the previously mentioned copending application, Ser. No. 492,407 of Edward H. Lorenz and George E. Rowe, although of course the aforesaid novel features of construction of the present invention may readily be incorporated in other glassware forming machines of the type herein disclosed, by one skilled in the art.

One preferred mode of operation of apparatus embodying the invention may be as follows:

After a previously formed parison is transferred in suitable known manner from a parison forming unit P or p on the parison mold table 7 to a companion finishing mold b on the finishing mold table 12, the continuous rotation of the parison mold table causes valves 49 and 78 respectively to be actuated by stops or buttons 54 and 87 at times depending upon the adjusted positions of said stops. The operation of valve 49 causes pneumatic pressure to be applied to piston 36 to provide the power for closing the parison body mold under the control of cam 35 with which cam roller 33 cooperates. The actuation of valve 78 results in the passage of air to the neck pin to cool the neck pin and the inner surfaces of the sections of the parison body mold.

Further rotation of the table 7 effects disengagement of cam roller 33 and cam 35, the parison body mold now being held closed by piston 36, after which the parison forming unit is inverted by the rack 19 operated through mechanism (not shown) connected to cam 20a.

Prior to, during, or after the inversion of the parison forming unit, valve 78 is moved to cut off position by the engagement of its dog 86 with stop or button 88, such engagement occurring at a time depending upon the adjusted position of said stop or button, whereupon the supply of cooling air ceases.

Further rotation of the table 7 moves the inverted parison forming unit beneath the charge-guiding device F which receives a charge of glass from a suitable glass feeder (not shown) and directs it into the parison forming unit. The charge of glass thus delivered to the parison forming unit now is compacted in the neck mold and body mold thereof by the engagement of the settle blow head S with the bottom of the parison body mold. Upon completion of that operation, counterblow baffle plate B may be moved into and locked in operative position as it is shown in full lines in Fig. 1, by the cooperation of cam roller 98 with cam 101, such operation taking place at a time predetermined by the adjustment of said cam.

The counterblow baffle plate B being in operative position, valve 78 now may be opened for the supply of counterblowing air through the neck pin into the cavity in the charge of glass formed by the neck pin by the engagement of dog 86 on the valve with stop member 89.

Stop member 89 may be so adjusted on its supporting rail 57 as to begin the supply of counterblowing air immediately after the movement of counterblow baffle plate B into operative position, and while the parison forming unit remains in inverted position, so as to minimize the chilling effect on the charge of glass produced by the settle blowing operation and to largely, if not entirely, prevent a settle wave in the finished article of glassware which might result from a delay in the application of counterblowing air to the charge of glass.

The supply of counterblowing air thus initiated may continue until dog 86 of valve 78 strikes the stop or button 91, the position of which may be adjusted in the same manner as stop 89 to predetermine the time at which the supply of counterblowing air is stopped. Either of the stops or buttons 89 and 91 may be shifted to vary the period of counterblowing as well as to vary the times of beginning and ending of the counterblow air supply.

If desired, the supply of counterblowing air may be begun during the time in which the parison forming unit is reverted, this being permissible inasmuch as the counterblow baffle plate previously is moved to operative position.

The times of beginning and ending of the supply of counterblowing air, and the period of counterblowing are varied according to the condition of the glass being shaped and to the characteristics of the finished ware which it is desired to produce.

The adjustable mounting of the cam 101 which effects the movement of counterblow baffle plate B into operative position not only affords variation in the time of operation of the counterblow baffle plate, but provides for the operation of the counterblow baffle plate at the appropriate time irrespective of the length of the parison body mold and the size of the baffle plate which is fitted thereto. Thus, the parison body molds of different sizes may be employed upon properly adjusting the cam 101.

After the termination of the supply of counterblowing air as above explained, dog 53 of valve 49 strikes stop member 55 to exhaust fluid pressure from cylinder 37, thereby permitting partial opening or cracking of the body mold for the reheat of the previously formed parison. The time at which the body mold is cracked depends of course upon the adjusted position of stop 55.

Air pressure having been exhausted from cylinder 37, the body mold may be completely opened by the cooperation of cam roller 33 with cam 35 to leave the parison suspended from the neck mold preparatory to the transfer of the parison to the appropriate finishing mold on the finishing mold table.

The application of counterblowing pressure within the glass in the parison mold during the reversion of the mold provides an additional advantage which is often of great importance, particularly in certain types of ware, namely that such pressure positively maintains the parison in intimate contact with the walls of the parison mold and bottom plate, and thus eliminates any tendency to a distortion or "throw" of the glass in an undesired manner by the forces set up during the reversion. In old practices, both when the parison is counterblown before reversion and when it is counterblown only after reversion, these forces frequently result in uneven chilling of the glass which tends to cause objectionable blemishes in the final ware.

It will be understood that various changes may be made in the details of construction and operation of apparatus embodying the invention without departing from the scope of the appended claims.

Having thus described my invention, what I desire to claim and to secure by Letters Patent is:

1. A glassware forming machine comprising a mold table mounted for rotation about a vertical axis, a parison forming unit carried by said table, said unit comprising a body mold, means for inverting said unit for the supply of a charge of glass thereto, and for subsequently reverting said unit, a counterblow baffle plate associated with said unit and movable therewith during the inversion and reversion of said unit, means for holding said counterblow baffle plate in engagement with the bottom of the body mold of said unit prior to the beginning of the reversion thereof, and means operable at any time prior to the beginning of the reversion of said unit and thereafter until reversion has been partially effected for applying counterblowing air to a charge of glass in said unit to shape the charge of glass into a parison.

2. A glassware forming machine comprising a mold table mounted for rotation about a vertical axis, a parison forming unit carried by said table, means for rotating said table, said unit including a body mold, means for inverting said unit about a horizontal axis, for the delivery of a charge of glass thereto, and for subsequently reverting said unit, a counterblow baffle plate associated with said unit and movable therewith, means operable prior to and during the reversion of said unit about said horizontal axis for holding the counterblow baffle plate in engagement with the bottom of the body mold of said unit, and means for supplying counterblowing air to said unit prior to and during the reversion of said unit, to shape the charge therein into a parison, and to maintain the glass in contact with the molds and baffle plate during reversion.

3. A glassware forming machine comprising a mold table mounted for rotation about a vertical axis, a parison forming unit carried by said table, means for rotating said table, said unit including a body mold, means for supporting said unit for inversion and reversion about a horizontal axis, means for inverting said unit for the delivery of a charge of glass thereto and for subsequently reverting said unit, a counterblow baffle plate associated with said unit and movable therewith, means for moving said baffle plate into engagement with the bottom of the body mold of said unit, means for applying counterblowing air to a charge of glass in said unit at any time during the reversion thereof, such time including the instant at which reversion begins, and means for preventing disengagement of the baffle plate and body mold during the application of counterblowing air to the charge of glass in said unit.

4. A glassware forming machine comprising a mold table mounted for rotation about a vertical axis, a parison forming unit carried by said table, means for rotating said table, said parison forming unit including a body mold, and a counterblow baffle plate, means for inverting said unit for the delivery of a charge of glass thereto, and for subsequently reverting said unit, means operable when said unit is in inverted position and prior to the beginning of the reversion thereof for moving the baffle plate into operative engagement with the body mold of said unit and for maintaining such engagement during and following reversion, means operable when said unit is reverted for disengaging said counterblow baffle plate and body mold, means operable at any time during the period of engagement of said baffle plate and body mold for supplying counterblowing air to said body mold, and means for selecting the time at which the application of such air to the charge in the body mold is initiated.

5. A glassware forming machine comprising a mold table mounted for rotation about a vertical axis, a parison forming unit carried by said table, means for supporting said unit for inversion and reversion about a horizontal axis, means for inverting and reverting said unit, and means for supplying counterblowing air to said unit to blow a charge of glass therein into a parison irrespective of the position of said unit in its path of movement about said horizontal axis, said last-named means being operable independently of the reversion of said unit.

6. A glassware forming machine comprising a mold table mounted for rotation about a vertical axis, a parison forming unit including a body mold and carried by said table, means for supporting said unit for inversion and reversion about a horizontal axis, means for inverting and reverting said unit, means for supplying counterblowing air to said unit to blow a charge of glass therein into a parison irrespective of the position of said unit in its path of movement about said axis, valve means for controlling the supply of counter-blowing air to said unit, means operating in response to the rotation of said table for actuating said valve means, means for selecting the time at which said valve means is opened independently of the reversion of said unit and for selecting the period during which it remains open, and means for holding the body mold closed at all times during the counterblow.

7. A glassware forming machine comprising a mold table mounted for rotation about a vertical axis, a parison forming unit carried by said table, said unit including a body mold, and a counterblow baffle plate, means for continuously rotating said table, means for inverting and reverting said unit about a horizontal axis, means for moving the counterblow baffle plate into engagement with the bottom of the body mold of said unit when said unit is in inverted position, means for disengaging the baffle plate and body mold when said unit is in reverted position, means for holding the baffle plate in engagement with the body mold during the reversion of said unit, means for supplying counterblowing air to said unit to blow a charge of glass therein into a parison irrespective of the position of said unit in its path of movement about said horizontal axis, valve means for controlling the supply of counterblowing air to said unit, and means operating independently of the reversion of said unit for actuating said valve means.

8. In a glass fabricating machine, a parison forming unit including a body mold and a bottom plate therefor mounted for inversion and reversion about a horizontal axis to permit a charge of glass to be fed into the body mold while in inverted position and a parison formed in the unit to be transferred in reverted position, means for moving the bottom plate into operative position with the mold while the same is in inverted position and for removing it while in reverted position and means for applying pressure air within the glass within the parison unit prior to the inversion thereof to expand the glass into intimate contact with the walls of the parison mold and the bottom plate and during reversion to positively maintain the glass in such contact during the reversion of the unit, the last-named means including means adjustable during operation of the machine to vary the time at which the application of air is initiated.

9. A glassware forming machine comprising a mold table mounted for rotation about a vertical axis, a parison forming unit carried by said table and including a counterblow baffle plate, means for supporting said unit for inversion and reversion about a horizontal axis through an angle of 180°, means for inverting and reverting said unit through said angle and for holding it in inverted and reverted positions, means for holding said counterblow baffle plate in engagement with the parison mold of said unit when said unit is in inverted and reverted positions and throughout the angle of movement of said unit about said horizontal axis, and means for supplying counterblowing air to said unit when in any of the positions which it assumes relative to said horizontal axis, including its position at the instant reversion thereof begins.

10. A glassware forming machine comprising a mold table, a parison forming unit thereon comprising a body mold and a counterblow baffle plate, means for rotating said mold table, means for inverting and reverting said parison mold unit, cam actuated mechanism for said baffle plate, means for connecting said mechanism to said unit and for supporting said counterblow baffle plate thereon, means for changing the relative positions of said baffle plate and its actuating mechanism and said unit, a stationary cam positioned for engagement by said cam actuated mechanism when said unit is in inverted position so that the baffle plate is moved into operative engagement with the body mold as a result of the rotation of said table, a second cam positioned for engagement by said cam actuated mechanism when said unit is in reverted position so that the baffle plate is moved out of engagement with said unit in response to the rotation of said table, and means for changing the vertical positions of said cams whereby when changes are made in the relative positions of the baffle plate and its actuating mechanism and said unit, the said cams may be given adjusted positions to suit the adjusted positions of the baffle plate and its actuating mechanism.

11. A glassware forming machine comprising a rotary mold table, a parison forming unit thereon including a body mold and a counterblow baffle plate, means for rotating said table, means for inverting and reverting said unit, cam-actuated means for moving said baffle plate into engagement with said body mold when said unit is in inverted position and prior to the beginning of the reversion thereof, a cam arranged to control said cam-actuated means and from which said means is disconnected during reversion of said unit, and means for locking said counterblow baffle plate in operative non-yielding engagement with the body mold to insure maintenance of such engagement during the reversion of said unit.

12. A glassware forming machine comprising a horizontally rotating table, a parison forming unit thereon, means for inverting and reverting said unit about a horizontal axis and for holding the unit in inverted and reverted positions, said unit including a body mold and a neck mold, a neck-pin cooperating with the neck mold, means for applying differential pressure to a charge supplied to said molds when in inverted position, means for withdrawing the neck-pin prior to reversion of said unit, a counterblow baffle plate, means for applying the baffle plate to the body mold while the body mold is held inverted and for maintaining the baffle plate in such position during and after reversion of said unit, and means for supplying counterblow air to the charge of glass wholly confined in said unit at any selected time after the withdrawal of the neck-pin, irrespective of whether the unit is inverted, is being reverted, or is reverted.

13. A glassware forming machine comprising a horizontally rotating table, a parison forming unit including a body mold and a neck mold mounted on said table, means for inverting and reverting such unit, a counterblow baffle plate, means for holding said baffle plate in engagement with the body mold during the reversion of said unit, means independent of the reversion of said unit for supplying counterblow air to said unit during reversion thereof, valve means for controlling the supply of counterblow air, and means for actuating said valve means independently of the reversion of said unit to initiate the application of air to a charge in said unit at any selected time during reversion.

14. A glassware forming machine comprising a horizontally rotating table, a parison forming unit including a body mold and a neck mold, means for inverting and reverting said unit, a counterblow baffle plate, means for holding said baffle plate in engagement with the body mold during reversion of said unit and for a predetermined period after reversion is completed, means independent of the reversion of said unit for supplying counterblow air to said unit during the period of engagement of the baffle plate and body mold, valve means for controlling the supply of counterblow air to said unit, and means for actuating said valve means independently of the reversion of said unit to admit counterblow air thereto during and subsequent to the reversion of said unit.

15. A glassware forming machine comprising a horizontally rotating table, a parison forming unit thereon, means for inverting and reverting said unit, said unit including a body mold, a neck mold, a neck pin cooperating with the neck mold, means for applying differential pressure to a charge delivered to the inverted molds to compact the charge about the neck pin, means for retracting the neck pin for the admission of counterblow air through the neck mold at least at the instant reversion of the unit begins, a counterblow baffle plate, means for engaging the baffle plate with the body mold at least at the instant that such reversion begins, means for conducting air from a counterblow air valve to the interior of the neck mold when the neck pin has been withdrawn, the counterblow air valve, means for opening said valve at least at the instant reversion of said unit begins, and for thereafter holding said valve open for a continuous application of counterblow air to the charge, and means for subsequently closing said valve when the counterblowing of the charge is completed.

HENRY W. INGLE.